United States Patent [19]
Trevoy et al.

[11] 3,821,412
[45] June 28, 1974

[54] PREVENTION OF FOOT ROT

[76] Inventors: Lloyd Woodbury Trevoy, 9411-143 Street, Edmonton, Alberta; Jeremy Greenfield, University of Saskatchewan, Saskatoon, Saskatchewan; Christopher Hedley Bigland, Saskatoon, Saskatchewan; James Douglas Milligan, University of Saskatchewan, Saskatoon, Saskatchewan; John Roman Moisey, 9515-70 Avenue, Edmonton, Alberta, all of Canada

[22] Filed: June 12, 1972

[21] Appl. No.: 261,865

[52] U.S. Cl. ............................................. 424/342
[51] Int. Cl. .......................................... A61k 27/00
[58] Field of Search ................................ 424/342

[56] References Cited
UNITED STATES PATENTS
3,639,593  2/1972  Garrison .......................... 424/342
3,653,499  4/1972  Richter ............................ 424/342

OTHER PUBLICATIONS

Keeping Livestock Healthy Yearbook of Agriculture (1942) pages 179, 180, 183 & 829–832.

*Primary Examiner*—Sam Rosen
*Attorney, Agent, or Firm*—Thomas J. Morgan; Marvin Turken; Ralph M. Pritchett

[57] ABSTRACT

A method which involves the treatment with paraformaldehyde of area, where the sheep or cattle spend time, for controlling the major problem of foot-rot of cattle and sheep. Preferably the treatment is made by even spreading of about 8 – 20 lbs. of paraformaldehyde per 1,000 square feet. The method may also be applied to limited area such as watering trough, water hole, feed-bunk and salt lick. At present the effectiveness of the methods known for controlling foot-rot are highly questionable.

3 Claims, No Drawings

PREVENTION OF FOOT ROT

This invention relates to a method of controlling foot rot in cattle and sheep.

Foot-rot in feedlots and animal pens is one of the major problems in the cattle and sheep finishing industry. A method of reducing this problem would be of great assistance to the industry. Some soils favour the foot-rot organism. The organism also apparently multiplies in wet soil. There are here however some conflicting opinions and some say a dry season may also be bad. At any rate the foot in such conditions becomes softened and lacerated, possible injured by gravel and is especially susceptible when the tissues are always wet. A break in the skin cannot always be seen.

A present control of questionable effectiveness is to sprinkle copper sulfate and slaked lime around the watering troughs. Attempts have also been made to use moats containing diesel fuel or used oil through which the animals walk but these materials could be toxic. Besides care is needed in diagnosing foot-rot. Other foot ailments such as laminitis could be confused with foot-rot. Due to the recent recognition of foot-rot as a serious problem in the United States, the U.S. Government has started a program.

It is also a serious problem for range cattle in Saskatchewan and Alberta: in Saskatchewan, pasture managers would agree that foot-rot is the number one problem.

Broadly stated the applicant has now found a method of controlling foot-rot of cattle and sheep comprising treating with paraformaldehyde on area where time is spent by at least one member of the class consisting of sheep and cattle.

By area is meant any location where cattle and sheep spend time, including cattle and sheep in community pastures or on the range, pens or pastures, limited areas thereof such as around water troughs, feed troughs and space adjacent to salt licks in community pastures.

In a preferred embodiment the treatment is obtained by spreading evenly said paraformaldehyde throughout a given area.

About 8 – 20 lbs. of paraformaldehyde per 1,000 feet$^2$ have shown marked reduction of foot-rot.

It is advantageous to repeat the treatment for instance about every 2 – 4 week period.

The following will now serve to illustrate embodiments of the invention.

EXAMPLE I

A trial to study the use of paraformaldehyde in controlling foot-rot in feedlot cattle was conducted with 12 pens of steers (12 steers per pen). Four pens of steers were used as control pens in which incidences of foot-rot were determined. Eight pens were treated with paraformaldehyde in the following manner:

Example No. 1 two pens with 25 lbs. on Day 1;
Example No. 2 two pens with 50 lbs. on Day 1;
Example No. 3 two pens with 25 lbs. on Day 1 and Day 15;
Example No. 4 two pens with 50 lbs. on Day 1 and 25 lbs. on Day 15.

The material was spread evenly throughout the entire pen (40' × 80' each). Cases of foot-rot prior to and after the test were recorded. Soil samples from four locations in each pen (water trough area, feed trough area, bedding area, and an intermediate area) were taken three times per week for four weeks. The samples were placed in plastic bags, sealed, labelled, and frozen for microbiological analysis.

All steers were observed daily and veterinary diagnosis of any lame or sick animals was obtained.

Results indicated that paraformaldehyde effectively controlled foot-rot in all treated pens for a one-month period in which the pens were extremely muddy and foot-rot was prevalent throughout the rest of the feedlot. (While the test was in progress 23 cases of foot-rot out of 144 steers (16 percent) were treated in the remaining pens at the feedlot.) The month prior to the test 13 cases of foot-rot were recorded throughout the 12 test pens and 3 cases were recorded for a one-month period after the test.

During the application of the paraformaldehyde care was taken to prevent inhalation and skin irritation of the employee.

The results are shown in Table I.

TABLE I

| Example No. | No. Pens | No. Steers | No. Cases Foot-Rot | % Foot-Rot |
|---|---|---|---|---|
| Control | 4 | 48 | 11 | 23% |
| 1 | 2 | 24 | 0 | 0% |
| 2 | 2 | 24 | 1 | 4% |
|  |  |  |  | 2% |
| 3 | 2 | 24 | 1 | 4% |
| 4 | 2 | 24 | 0 | 0% |

In the initial feedlot test the paraform prills were applied to the total surface of the pen. only two cases of foot-rot developed in the 96 cattle on test, while in 12 pens not part of the test there were 23 cases in 144 cattle.

EXAMPLE 2.

The same was conducted but with sheep and gave similar results.

The embodiments of the invention in which an exclusive property or privilege is claimed are defined as follows:

1. A method of controlling foot-rot of cattle or sheep which comprises spreading paraformaldehyde over the ground area occupied or frequented by said cattle or sheep in an amount of about 8 to 20 pounds of paraformaldehyde per 1,000 square feet of said area.

2. The method of claim 1 wherein said spreading of paraformaldehyde is repeated after an interval of about 2 to 4 weeks.

3. The method of claim 1 wherein said occupied area is a cattle or sheep pen and said frequented area in the area surrounding a watering trough, water hole, feed bunker, or salt lick.

* * * * *